United States Patent
Lopez et al.

(10) Patent No.: US 9,148,222 B2
(45) Date of Patent: Sep. 29, 2015

(54) AFDX NETWORK WITH A PASSIVE OPTICAL NETWORK

(71) Applicant: AIRBUS OPERATIONS (S.A.S.), Toulouse (FR)

(72) Inventors: Juan Lopez, Grenade (FR); Jean-Bernard Itier, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 77 days.

(21) Appl. No.: 13/715,105

(22) Filed: Dec. 14, 2012

(65) Prior Publication Data

US 2013/0156427 A1 Jun. 20, 2013

(30) Foreign Application Priority Data

Dec. 15, 2011 (FR) ...................................... 11 61659

(51) Int. Cl.
*H04B 10/27* (2013.01)
*H04J 14/00* (2006.01)

(52) U.S. Cl.
CPC ...................................... *H04B 10/27* (2013.01)

(58) Field of Classification Search
CPC ........................................................ H04B 10/27
USPC ........... 398/78, 202, 58, 66, 45; 370/389, 397
See application file for complete search history.

(56) References Cited

U.S. PATENT DOCUMENTS

| | | | |
|---|---|---|---|
| 7,352,744 B2 | 4/2008 | St. Etienne et al. | |
| 2006/0127087 A1* | 6/2006 | Kasai et al. | 398/45 |
| 2008/0037535 A1* | 2/2008 | Yoon et al. | 370/389 |
| 2008/0304828 A1* | 12/2008 | Mizutani et al. | 398/78 |
| 2009/0180482 A1* | 7/2009 | Andreoletti et al. | 370/397 |
| 2009/0208227 A1* | 8/2009 | Yoshida et al. | 398/202 |
| 2010/0284313 A1* | 11/2010 | Monnier | 370/294 |
| 2011/0155847 A1 | 6/2011 | Journade | |

FOREIGN PATENT DOCUMENTS

| | | |
|---|---|---|
| EP | 2190739 | 6/2010 |
| FR | 2832011 | 5/2003 |
| FR | 2920623 | 3/2009 |
| WO | WO 2009/037267 | 3/2009 |

OTHER PUBLICATIONS

"AFDX protocol tutorial," http://sierrasales.com/pdfs/AFDXTutorial.pdf, 2005, Condor Engineering, Santa Barbara, California, United States.

* cited by examiner

*Primary Examiner* — David Payne
*Assistant Examiner* — Omar S Ismail
(74) *Attorney, Agent, or Firm* — Jenkins, Wilson, Taylor & Hunt, P.A.

(57) ABSTRACT

The present invention concerns an AFDX network which is extended by a passive optical network or PON. The AFDX network comprises an AFDX switch to which are connected a plurality of equipments. The AFDX switch constitutes the optical line termination and said equipments constitute the optical network terminations of the PON. The PON broadcasts over the downlink, to all said equipments, every AFDX frame output by said AFDX switch. It also multiplexes over the uplink the AFDX frames transmitted by the same equipments. The invention also concerns an μAFDX network using a PON.

15 Claims, 6 Drawing Sheets

AFDX NETWORK WITH A PASSIVE OPTICAL NETWORK

CROSS-REFERENCE TO RELATED APPLICATION

This application claims the benefit of and priority to French Patent Application No. 11 61659 filed Dec. 15, 2011, the entire disclosure of which is herein incorporated by reference.

TECHNICAL FIELD

The present invention relates to the field of aeronautic telecommunications and more particularly to that of AFDX (Avionics Full Duplex Switched Ethernet) networks.

BACKGROUND

The field of aeronautic telecommunications has been highly developed in recent years.

Conventionally, the avionic networks use a bus topology standardized in the ARINC 429 standard.

More recently, the AFDX (Avionics Full Duplex Switched Ethernet) network, developed for aeronautics is based on the switched Ethernet principle. It will be reminded that switched Ethernet networks can operate under two distinct modes which however are compatible with each other: a so-called shared mode, wherein a same physical support is shared among terminals, with a random access and frame collision detection, and a so-called switched mode, wherein terminals exchange frames by means of virtual link connections, also called virtual links, thus ensuring the absence of collisions.

The AFDX network has been standardized in the ARINC 664 standard, Part 7. A description of the AFDX network is in particular found in the document entitled "AFDX protocol tutorial" available under http://sierrasales.com/pdfs/AFDX-Tutorial.pdf URL as well as an introduction to virtual links in FR-A-2832011 filed on behalf the present applicant. It will be merely reminded herein that the AFDX network is full-duplex, deterministic and redundant.

By full-duplex, it is meant that each subscriber to the network (terminal, calculator) can simultaneously transmit and receive frames on virtual links. The AFDX network is deterministic in that virtual links have characteristics ensured in terms of latency terminal, physical flow segregation, bandwidth and rate. For this, each virtual link has available an end-to-end reserved path through the network. Finally, the AFDX network is redundant because the underlying Ethernet network is duplicated for availability reasons.

A subscriber to an AFDX network is directly connected to a switch of this network. Data of a subscriber are transmitted as IP packets encapsulated in Ethernet frames. Unlike the conventional Ethernet switching (using the Ethernet address of the recipient), the switching of frames on an AFDC network uses a virtual link identifier included in the frame header. When a switch receives a frame on an input port thereof, it reads the virtual link identifier and determines from its switching table the output port(s) on which the frame should be transmitted.

All the equipments on board an aircraft, in particular the different sensors distributed in the aircraft, cannot be directly connected to a switch of the AFDX network. Indeed, given the great number of relevant equipments, this would require to use a great number of such switches. Moreover, since the switches are located in avionic racks, in other words generally far from sensors, this solution would imply to use numerous and long wired connections, which would be detrimental to the apparatus mass budget.

To overcome this difficulty, it has been proposed to use frame switching devices, commonly called AFDX micro-switches which has a hub function over the downlink and a switching function over the uplink. Such a micro-switch enables the ADFX network to be extended such that remote equipments can access it. To do this, it is on the one hand connected directly to a switch of the AFDX network and on the other hand, to said remote equipments. When the AFDX micro-switch receives a frame incident over the downlink, it replicates it and transmits it to all the equipments which are connected thereto. Conversely, when the AFDX micro-switch receives a frame over the uplink, that is a frame transmitted by one of the equipments in question, this it transmitted to the AFDX switch to which it is connected.

An exemplary embodiment of AFDX micro-switch has been described in Patent application FR-A-2920623 filed on behalf of the present applicant.

FIG. 1 schematically represents an exemplary AFDX network, which is extended using an AFDX micro-switch.

The AFDX network 100 consists of a plurality of AFDX switches connected with each other by physical connections (twisted pairs) 105.

The terminals 110, being subscribers to the AFDX network, are each directly connected to an AFDX switch 120.

The remote equipments 150 are not directly connected to the AFDX network but to an AFDX micro-switch 120, via physical connections 155. On the other hand, the micro-switch 130 is directly connected to a switch of this network via a physical connection 135. It will be understood that all the micro-switch and physical connections 135, 155 represent an access network 170 for the remote equipments 150. In other words, the access network 170 enables the base AFDX network 100 to be extended to the remote equipments.

In FIG. 1 is represented a virtual link $VL_{ap}$ connecting the subscriber terminal A to the remote equipment $E_p$. Frames transmitted by the terminal on this virtual link are received by the micro-switch 130 which acts as a hub over the downlink by transmitting them to all the equipments $E_k$, k=1, ..., K which are connected thereto. The equipments different from the recipient $E_p$ reject the frames in question from the virtual link identifier.

Conversely, a virtual link $VL_{qb}$ has been represented connecting the remote equipment $E_q$ to the subscriber terminal B. Frames transmitted by the t remote equipment $E_q$ on this virtual link are automatically transmitted (without header reading) by the micro-switch to the AFDX switch, SW, to which it is connected. The frames are then switched through the AFDX network by the switches 120 from the virtual link identifier contained in the frame header, until reception by the subscriber B.

FIG. 2 represents an exemplary network connecting a terminal to a plurality of equipments by means of an AFDX micro-switch.

The terminal A, designated by 210, is connected to a set of equipments 250, noted $E_k$, k=1, ..., K through a micro-switch 230 but, unlike the previous example, without resorting to an AFDX network. The terminal 210 can herein be located in the vicinity of the equipments 250.

The network consisting of the micro-switch 230, the physical connections 235 and 255 is conventionally called µAFDX network.

The operating principle of this network is similar to that of the previous example. When the terminal A transmits frames on a virtual link $VL_{ap}$ to an equipment $E_p$, these are transmitted by the micro-switch to all the equipments 250, these being in charge of selecting the frames intended thereto based on the virtual link identifier. Conversely, when an equipment $E_p$ transmits frames to the terminal B on the virtual link $VL_{qb}$, the micro-switch 230 merely transfers frames it receives from the equipment in question to said terminal.

It will be understood that an μAFDX network, much like the previous AFDX network, forwards AFDX frames using a frame switching, however the switching is only performed herein over the uplink. Thus, an AFDX network, whether extended or not, an μAFDX network, can all be called AFDX frame switched networks.

Whatever the network configuration, the AFDX switches and AFDX micro-switches are like to be affected by electrical failures and electromagnetic disturbances. Even though the redundancy of the AFDX network allows to overcome these drawbacks to some extent, there is a need for making switching devices free of these.

Furthermore, the AFDX switches and AFDX micro-switches consume electric power and dissipate heat. Therefore, they cannot be installed in great numbers in confined zones of the airplane, such as the avionic rack, without resorting to a cooling system.

One object of the present invention is to extend or even to make an AFDX frame switching network using at least one frame switching device which has not the abovementioned drawbacks, that is using a frame switching device which is robust and of very low consumption.

SUMMARY

The present invention is defined by an AFDX frame switching network comprising at least one AFDX frame switch to which are connected a plurality of equipments, at least one terminal being a subscriber to said network, the AFDX network further comprising a passive optical network, the optical line terminal (OLT) of which consists of the AFDX frame switch and the optical network terminals (ONTs) of which consist of said equipments, said passive optical network broadcasting over the downlink every AFDX frame output by said frame switch to all said equipments and multiplexing over the uplink the AFDX frames transmitted by said equipments.

The passive optical network advantageously comprises an optical coupler connected to a port of said frame switch by means of a first optical fiber, on one hand, and to said equipments by means of a plurality of second optical fibers, on the other hand.

According to a first alternative, the passive optical network multiplexes over the uplink the AFDX frames respectively transmitted by said equipments using a multiplexing by transmission time interval, a distinct transmission time interval being allocated to each equipment.

Said frame switch is then in charge of controlling the allocation of transmission time intervals to said equipments. Alternatively, a subscriber to this network controls the allocation of the transmission time intervals to said equipments.

According to a second alternative, the passive optical network multiplexes over the uplink the AFDX frames respectively transmitted by said equipments using a wavelength multiplexing, a distinct wavelength being allocated to each equipment.

Advantageously, for a virtual link output by a first equipment and intended to a second equipment of said plurality, the first and second equipments being connected to the optical coupler, said virtual link being incident on said port (P) of the frame switch, said switch loops this virtual link back to said port.

For that purpose, the frame switch can contain a switching table for switching frames relating to different virtual links, said table indicating, for each virtual link, an input port and an output port of said switch, a frame relating to this virtual link received on said input port being switched on said output port, said table further indicating that the output port is identical to the input port for said virtual link output by the first equipment and intended to the second equipment.

Alternatively, a terminal being a subscriber to the AFDX network is connected to a second port (P') of the frame switch, distinct from said port, the subscriber terminal looping back any virtual link coming from a first equipment and intended to a second equipment of said plurality.

The present invention also relates to an AFDX frame switching network, comprising a terminal and a plurality of equipments, being subscribers to the network, said network further comprising a passive optical network, the optical line terminal (OLT) of which consists of said terminal and the optical network terminals (OLTs) of which consist of said equipments, said passive optical network broadcasting over the downlink every AFDX frame transmitted by said terminal to all said equipments and multiplexing over the uplink the AFDX frames transmitted by said equipments.

The passive optical network advantageously comprises an optical coupler, connected to said terminal by means of a first optical fiber, on the one hand, and to said equipments by means of a plurality of second optical fibers, on the other hand.

According to a first alternative, the passive optical network multiplexes over the uplink the AFDX frames respectively transmitted by said equipments using a multiplexing by transmission time interval, a distinct transmission time interval being allocated to each equipment.

Said terminal is then in charge of controlling the allocation of transmission time intervals to said equipments.

According to a second alternative, the passive optical network multiplexes over the uplink the AFDX frames respectively transmitted by said equipments using a wavelength multiplexing, a distinct wavelength being allocated to each equipment.

Said terminal advantageously comprises a physical interface to which is connected said first optical fiber, an AFDX interface, communicating with said physical interface and storing the AFDX frames received or to be transmitted by the latter in a plurality of mailboxes, each mailbox being associated with a virtual link in reception or transmission, and an applicative module controlling said AFDX interface.

Said AFDX interface advantageously contains a table indicating for each virtual link identifier a mailbox in transmission or reception, said AFDX interface reading virtual link identifiers present in headers of AFDX frames received by the physical interface and storing these frames in the reception mailboxes as a function of these virtual link identifiers.

For a virtual link between first and second equipments of said plurality of equipments, said applicative module reads the AFDX frames stored in the reception mailboxes associated with this virtual link and stores them in the transmission mailboxes associated with the same virtual link.

BRIEF DESCRIPTION OF THE DRAWINGS

Further characteristics and advantages of the invention will appear upon reading embodiments of the invention made in reference to the appended figures wherein.

DETAILED DESCRIPTION

The idea underlying the invention is to extend or even to make an AFDX frame switching network by means of an EPON (Ethernet Passive Optical Network) or GPON (Giga Passive Optical Network) technology used in a field very far from aeronautic telecommunications, that is that of optical local area loop, connecting a user to the network of an operator.

Figure 3:
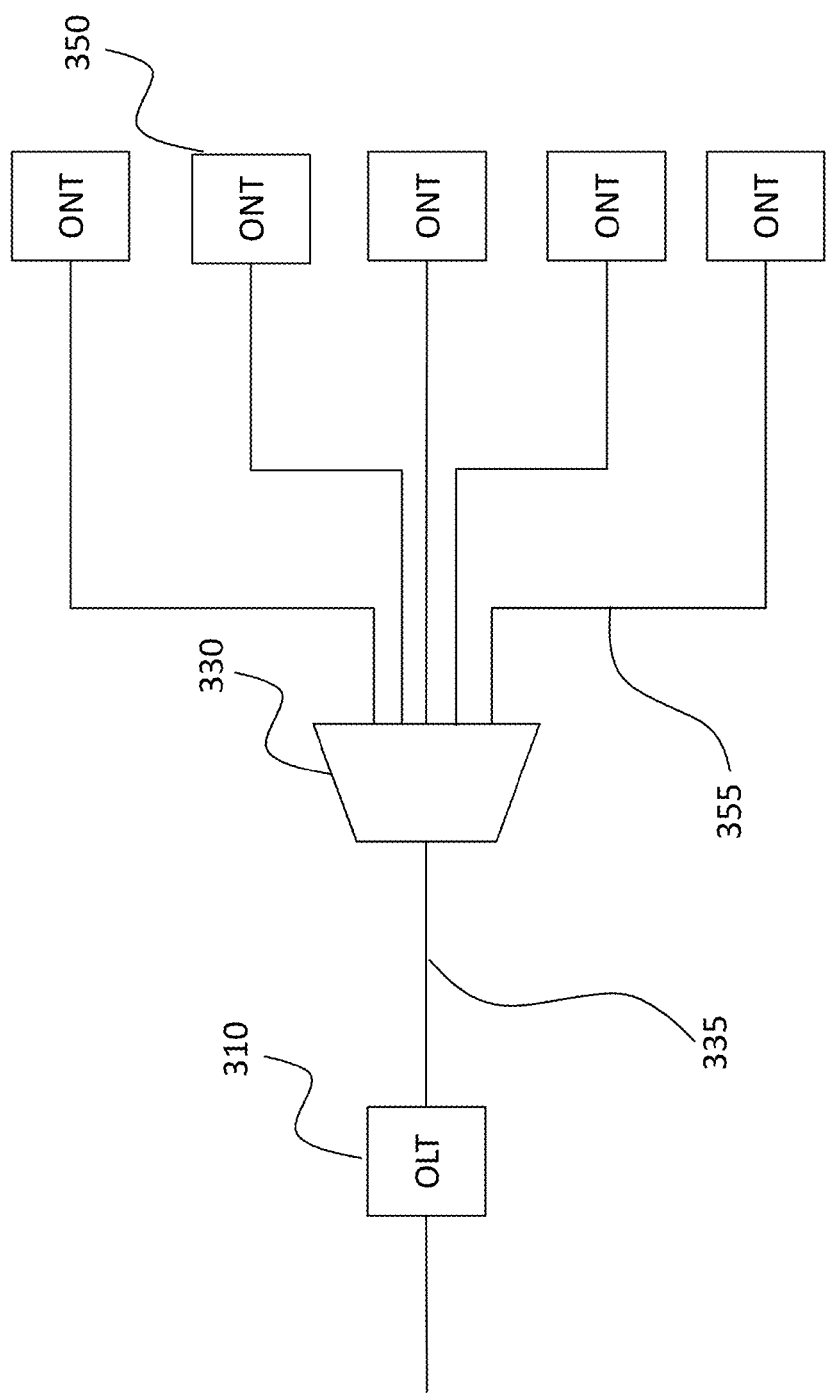
FIG. 3 schematically represents a PON type optical local area loop.

An optical local area loop is generally as a passive optical network (PON) having a tree structure, as schematically illustrated in FIG. 3.

The PON network connects a central equipment of the operator, commonly called Optical Line Terminal (OLT) 310 to a plurality of active equipments, called optical network terminals 350, commonly called Optical Network Units (ONU) or even Optical Network Terminals (ONTs).

Each optical network terminal (ONT) serves a final user and ensures the connection between this user and the terminals.

The optical line terminal (OLT) ensures the connection of the network head to the operator. It also ensures the conversion of electrical signals into optical signals over the downlink and conversely the conversion of optical signals into electrical signals over the uplink.

The PON network further comprises at least one optical coupler (splitter) 330, coupling the optical fiber 315, connected to the optical line terminal (OLT), into a plurality of optical fibers 355, respectively connected to the terminals ONTs. The optical coupler(s) of the PON network is (are) purely passive.

The PON networks have been standardized before international organisations such as ITU (international Telecommunication Union), FSAN (Full Service Access Network) and IEEE. When frames emitted on the PON network are of the Ethernet type, EPON (Ethernet Passive Optical Network) is generally preferably referred to. In the EPON technology, an Ethernet frame coming from the optical line terminal (OLT) is broadcasted to all the optical network terminal (ONTs). The ONT which recognizes its address retrieves the Ethernet frame and the other ones ignore it. Over the uplink, Ethernet frames are transmitted according to a Time Division Multiplexing (TDM) type access share, wherein each ONT can transmit successively. More recently, GPON (Giga Passive Optical Network) networks have enable rates to be increased up to 40 Gbit/s. They have been standardized in G.984.1 to G.984.4 recommendations from ITU-T.

Figure 4:
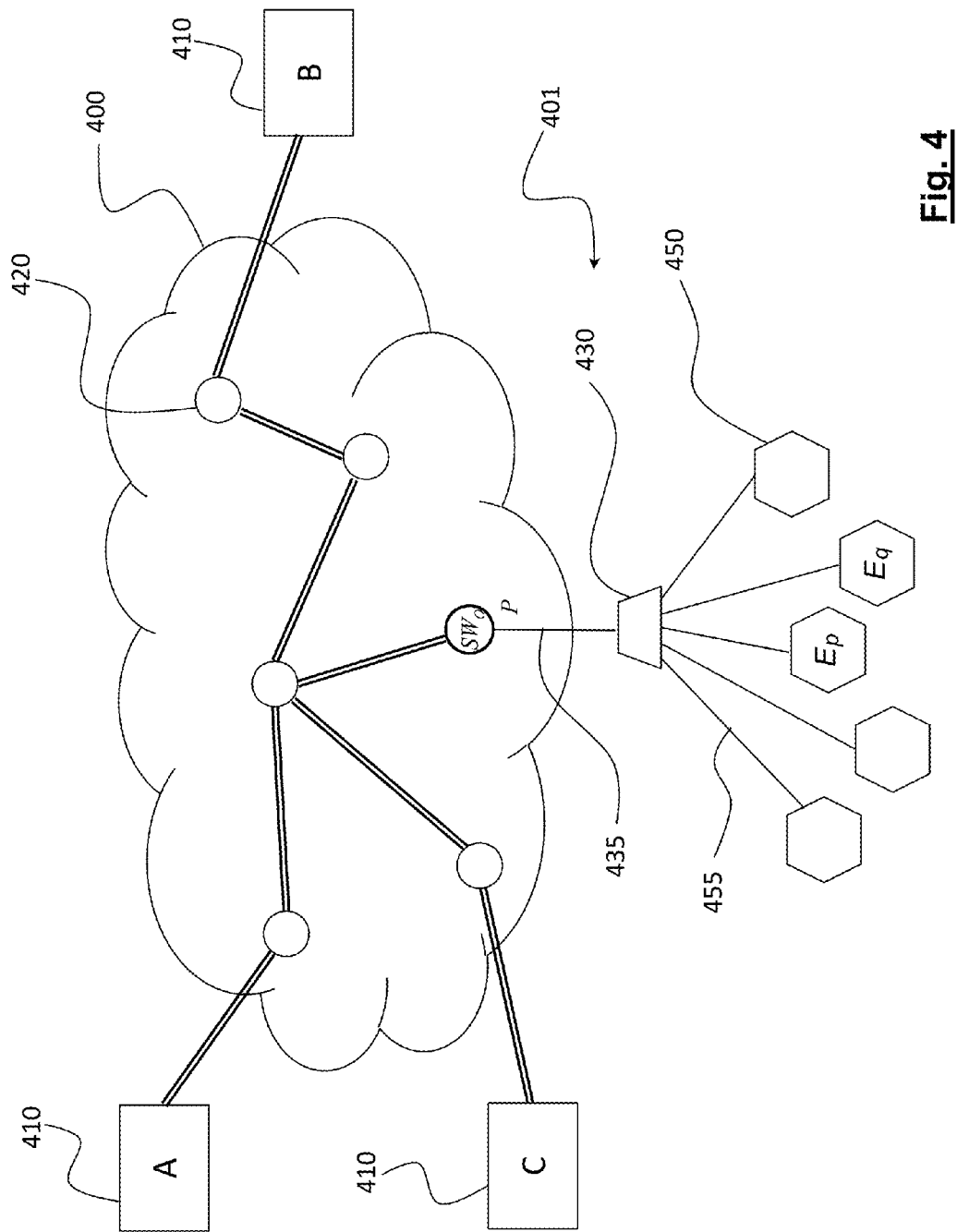
FIG. 4 represents an AFDX network which is extended using a passive optical network, according to a first embodiment of the invention.

FIG. 4 schematically represents an AFDX network which is extended using a passive optical network, according to a first embodiment of the invention.

Figure 1:
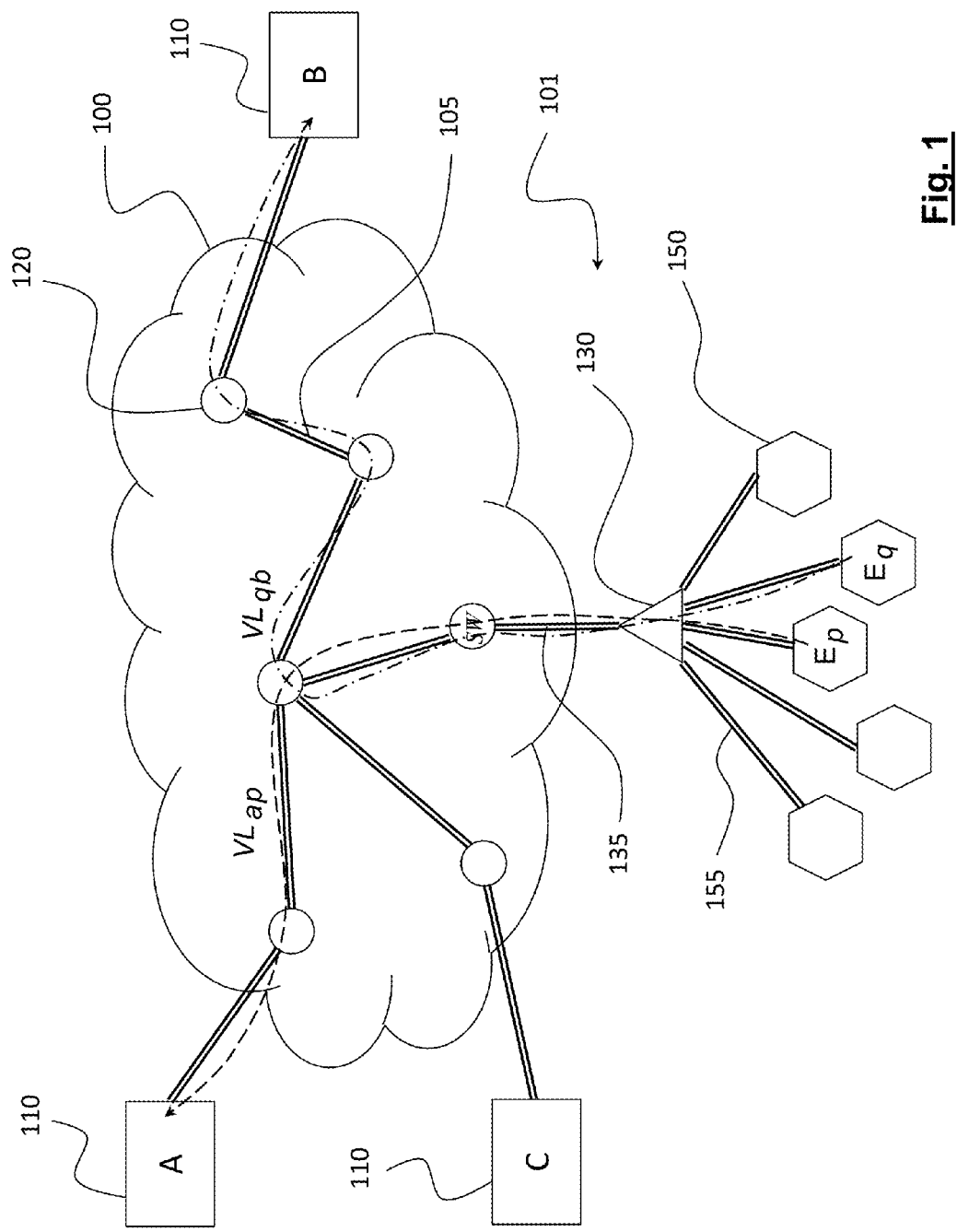
FIG. 1, already described, represents a known example of the AFDX network which is extended using an AFDX microswitch.
Figure 2:
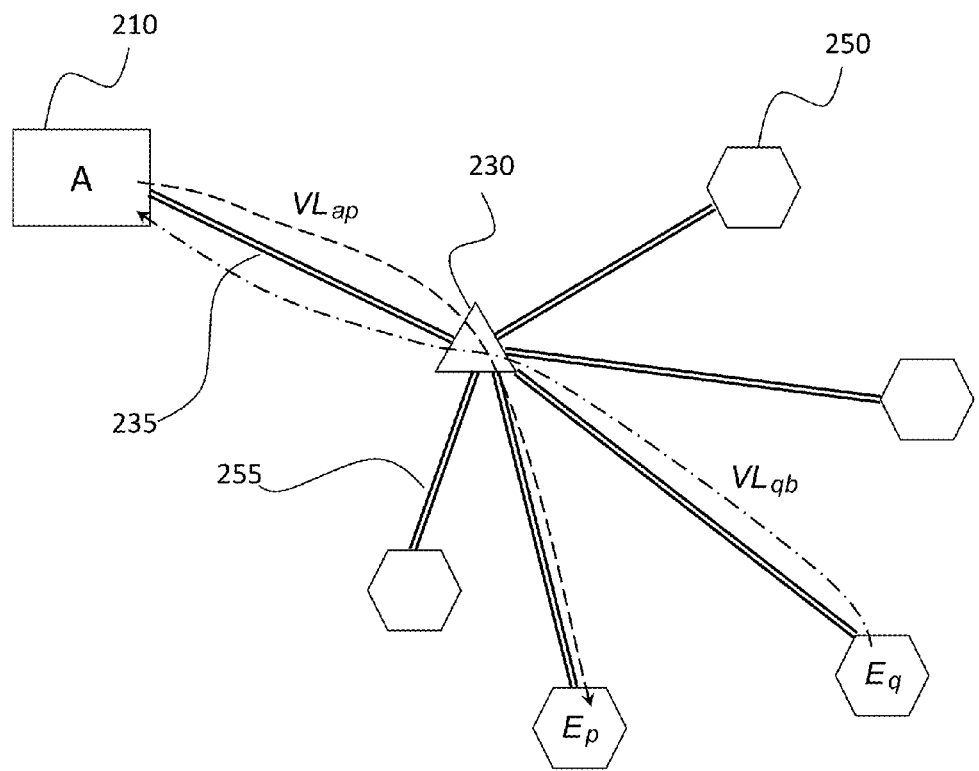
FIG. 2, already described, represents a known example of p AFDX network.

The AFDX network 400 is similar to that of FIG. 1. It comprises AFDX switches 420 connected by physical connections 425. The subscribers to the AFDX network 410 are each directly connected to an AFDX switch 420. Communications between subscribers are made using virtual links forwarding AFDX frames in a known manner per se.

Unlike prior art, a PON type access network 401 is provided, enabling remote equipments 450 to be connected to the AFDX network. The PON type access network is directly connected to a port P (consisting of an input port and an output port) of the switch $SW_O$. Unlike a conventional AFDX switch, the $SW_O$ switch is equipped on this port P with a converter of electrical signals into optical signals over the downlink as well as with a converter of optical signals into electrical signals over the uplink. The $SW_O$ switch acts as an OLT terminal of the PON network.

The PON type network further comprises an optical coupler 430 connected, on the one hand, to the port P of the $SW_O$ switch by means of a first optical fiber 435 and, on the other hand, to the remote equipments 450 by means of second optical fibers 455. These remote equipments are provided, as required, with electro-optical converters in transmission and/or optoelectronic converters in reception, or they are capable of transmitting and/or receiving information as optical signals. The equipments 450 act as ONT terminals of the PON type network.

The PON type network is more precisely an EPON network or a GPON network, as indicated above.

Over the downlink, the frame flow received by the optical coupler from the $SW_O$ switch is broadcasted to all the equipments 450. In other words, any downstream virtual link passing through the port P of the $SW_O$ switch leads necessarily to all the equipments 450 connected to the latter via the access network 401, whether they are recipients or not. Each equipment then selects the frames intended thereto thanks to the virtual link (VL) identifier contained in the header.

Conversely, over the uplink, the frames emitted by the different equipments 450 are multiplexed on the optical fiber 435 via the optical coupler 430. Different multiplexing alternatives can be contemplated.

The access multiplexing can be performed in wavelength, that is WDM (Wavelength Division Multiplexing), or by transmission time interval, in other words TDM (Time Division Multiplexing). As required, the access multiplexing can both be by transmission time interval and in wavelength.

In the case of a WDM type access multiplexing, the transmission resources are wavelengths $\lambda_1, \ldots, \lambda_M$ and each equipment 450 has available its own wavelength to transmit its frames. The switch is then equipped with a wavelength demultiplexer to retrieve frames from different equipments.

In the case of a TDM type access multiplexing, the transmission resources are transmission time intervals $T_1, \ldots, T_N$ of a time frame. The transmission time intervals are allocated to the different equipments, either by the $SW_O$ switch, or by a subscriber to the AFDX network in charge of allocating transmission resources. The allocation can be performed according to different criteria and periodically updated. For example, the allocation can take a priority degree between different equipments into account or even depend on the queue lengths of frames to be transmitted by the different equipments.

In the case of a mixed TDM/WDM access multiplexing, the transmission resources are wavelength and transmission time interval couples $(\lambda_n, T_m)$. The resource allocation is performed as previously either by the $SW_O$ switch or by a subscriber to the AFDX network in charge of this task. In the second case, the allocation information can be emitted by the subscriber in question to the different equipments by means of a specific multicast type virtual link.

Further access multiplexing alternatives can be contemplated by those skilled in the art without departing from the scope of the present invention. Thus, subcarrier intervals of an OFDM (Orthogonal Frequency Division Multiplexing) multiplex could be used as transmission resources.

Whatever the access multiplexing type implemented, the frames emitted by the different equipments are received on the port P of the $SW_O$ switch. This switches the frames conventionally from the virtual link identifiers contained in the respective headers of the frames and a switching table stored in the switch.

If required, the switching table of the $SW_O$ switch can be configured so as to route a virtual link between first and second equipments 450. To do this, the switching table indicates that, for this virtual link (identified in the table by its VL), any frame incident on the port P is sent back on the same port. The incident frame is then transmitted to all the equipments 450 connected to $SW_O$ through the access network. The recipient equipment of the virtual link preserves the frame and the others simple reject it.

Alternatively, the looping back to the port P could be simply performed by simply wiring the input port on the output port. Thus, any frame incident on the port P will be sent back via the same port to all the equipments 450. In this alternative, it will be noted that a frame transmitted by an equipment 450 to a subscriber 410 will also be transmitted to all the equipments 450. However, since these are not recipients of said frame, they will simply reject it.

Whatever the alternative, it will be understood that a virtual link output from a first equipment and intended to a second equipment, connected to the same optical coupler, will be looped back by a switch to the port P, either at the frame (or connection) level or at a physical level, that is advantageously at a low protocol level. In particular, it is not necessary in such a situation to transmit AFDX frames from a first equipment to a remote subscriber, located in the avionic rack, in order for the same to retransmit them to the second equipment in question. Thanks to the local looping back of the virtual link at the switch, an overloading of calculators of the avionic rack and increase in the latency time of frames are avoided.

Finally, the looping back of the virtual link can be ensured not by the $SW_O$ switch but by a dedicated terminal, being a subscriber to the AFDX network, called a looping back terminal (not represented), connected directly (or indirectly) to a port P' of this switch, distinct from the port P. The looping back terminal sends back on a virtual link, passing through the port P, the frames it receives from the $SW_O$ switch. It acts somehow as a reflector for frames output by a first equipment $E_p$ and intended to a second equipment $E_q$, when both equipments are connected to the same optical coupler 430. To do this, if the identifier of a virtual link output by $E_p$ and intended to $E_q$ is written as $Id_{pq}$, the switching table of the frame switch indicates that each frame incident on the port P and having the identifier $Id_{pq}$ is to be switched on the port P'. Conversely, any frame incident on the port P' and having the identifier $Id_{pq}$ is to be switched on the port P. Thus, frames relating to the local traffic between equipments 450 transit by the optical coupler, the port P, the port P' of the switch, the looping back terminal, before coming back.

Those skilled in the art will understand that the embodiment enables remote equipments to become subscribers to the AFDX network thanks to a passive optical network, with a very low failure risk and a very low electrical power consumption. The network which is thus extended by the PON network remains an AFDX frame switching network.

Figure 5:
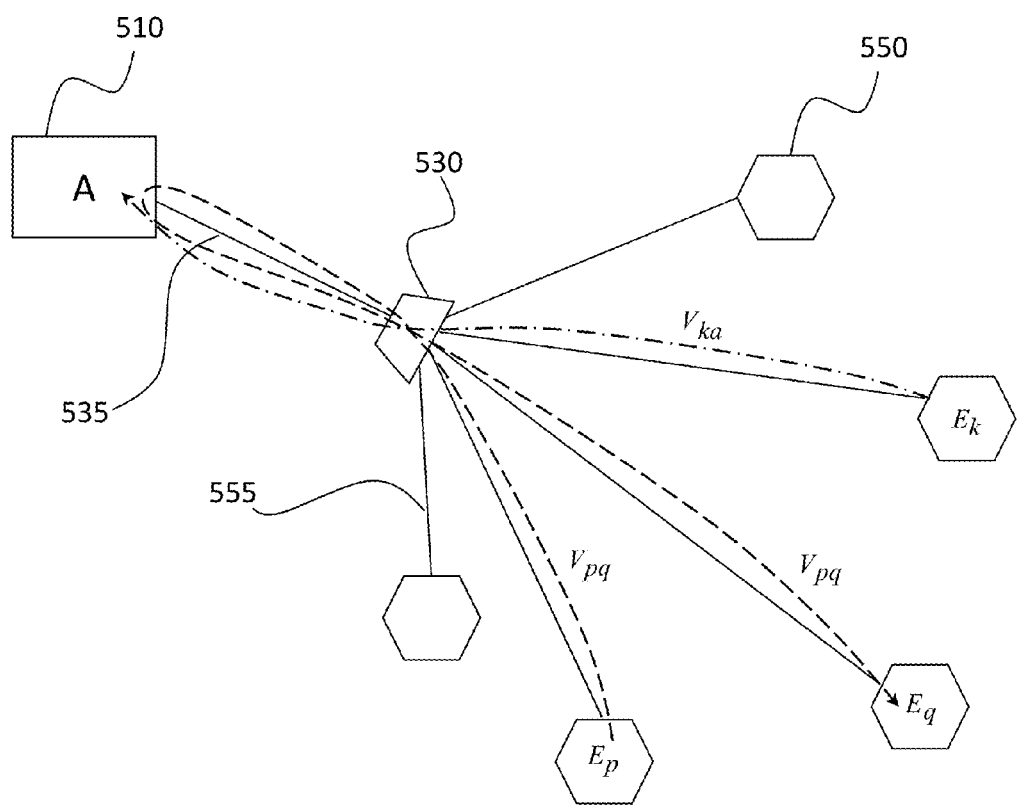
FIG. 5 represents an p AFDX network based on a passive optical network, according to a second embodiment of the invention.

FIG. 5 represents an μAFDX network connecting a plurality of subscribers 510, 550 by means of a PON type network.

Unlike the previous embodiment, the PON network directly connects subscribers not through an AFDX network (absence of an AFDX switch).

In this embodiment, one of the subscriber 510 acts as an optical line terminal (OLT) and all the others 550 that of optical network terminals (ONTs). To make the distinction thereof easier and draw a parallel with the first embodiment, the first one will be referred to as a terminal (A) and the others as equipments hereinafter. However, all of them are of course subscribers to the network, only one of them, 510, playing the particular role of OLT.

The terminal 510 is connected to the optical coupler 530 by means of a first optical connection 535 and the equipments 550 are connected to the same coupler using second optical connections 555.

The terminal 510 is equipped with an electro-optical converter over the downlink and/or with an optoelectronic converter on the uplink. Alternatively, the terminal 510 can directly emit/receive optical signals.

Over the downlink, the frame flow from the terminal 510 is broadcasted by the optical coupler 530 to all the equipments connected thereto. In other words, any virtual link from the terminal 510 serves all the equipments 550. However, only the recipient equipment preserves frames relating to this virtual link, the non-recipient equipments removing them.

Conversely, over the uplink, the frame flows from different equipments 550 are multiplexed on the first optical fiber 535 by means of the optical coupler 530. The different access multiplexing types mentioned for the first embodiment can also be implemented herein. In particular, if the access multiplexing is of the TDM type, distinct time intervals are allocated to the different equipments for transmitting frames. The allocation of transmission time intervals is then performed by the terminal 510 according to one of the abovementioned criteria.

Each equipment 550, as the terminal 510, can be the source or recipient of a virtual link. To ensure forwarding frames on a virtual link $VL_{pq}$ output by a first equipment $E_p$ and intended to a second equipment $E_q$, the terminal 510 sends back to its output port the frames it receives from $VL_{pq}$ on its input port. In other words, the virtual link $VL_{pq}$ is looped back by the terminal 510 to the PON network. Thus, a frame relating to the virtual $VL_{pq}$, emitted by the equipment $E_p$ is received by the terminal 510 before being sent back by the latter to all the equipments 550.

On the other hand and advantageously, a virtual link $V_{ka}$ output by an equipment $E_k$ and intended to the terminal 510 is not looped back. The frame emitted by the equipment $E_k$, receiving on the input port of the terminal 510 is locally processed by the latter without sending back on its output port. Thus, it is avoided that the PON network is saturated by useless frame transmissions.

Finally, it is worth of note that, as in the first embodiment, the looping back of virtual links is performed at a low protocol level (herein connection layer) and that, consequently, it does not mobilise the applicative layers of the terminal 510.

Figure 6:
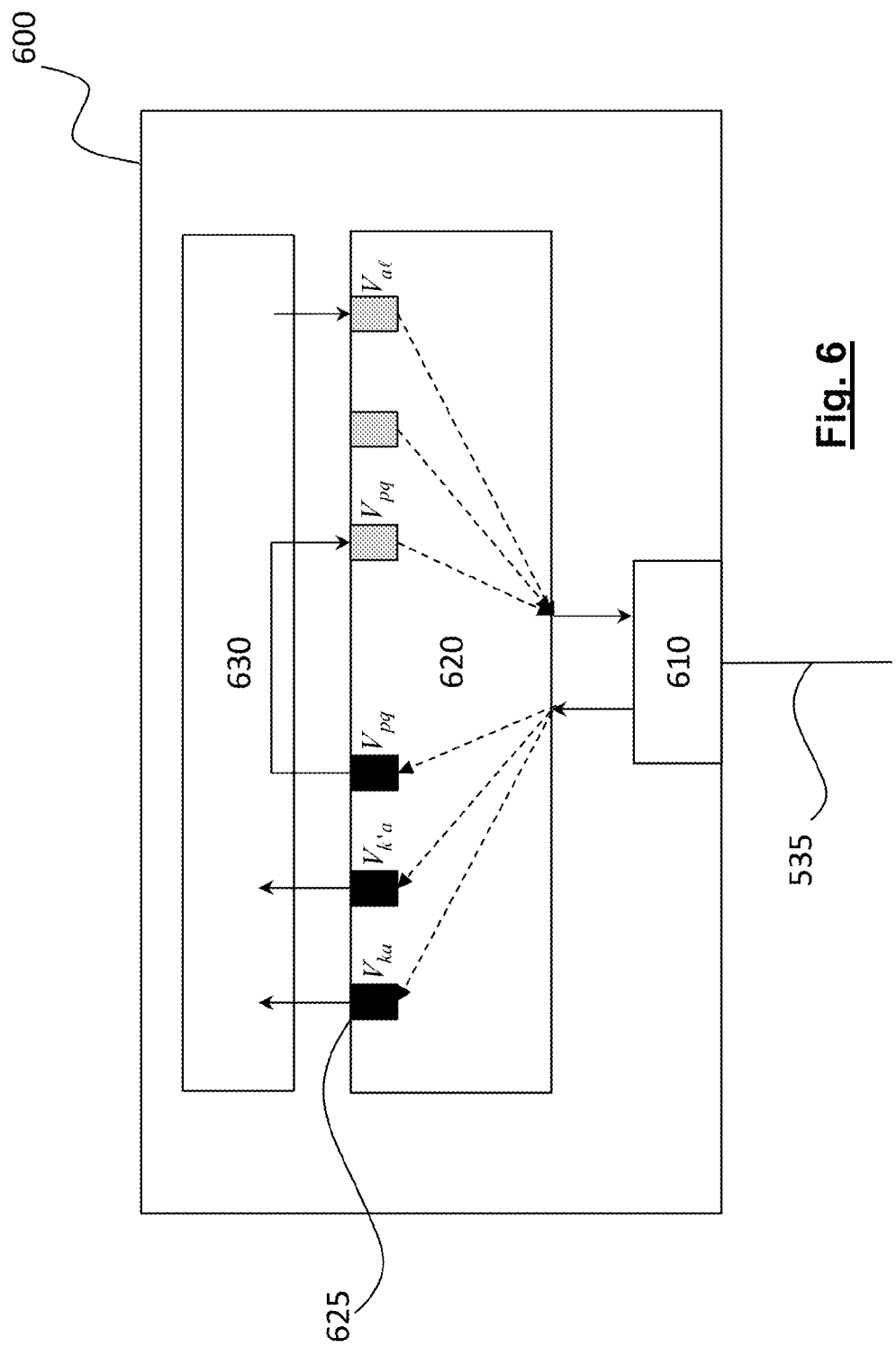
FIG. 6 schematically represents the architecture of a terminal likely to be used with the p AFDX network of FIG. 5.

FIG. 6 schematically represents the architecture of a terminal 600, likely to be used in the network of FIG. 5, more precisely that of terminal 510 playing the role of OLT in the PON network.

The terminal, being a subscriber to the network, comprises a physical interface 610, for being connected to the optical fiber 535, an AFDX interface 620, communicating with the physical interface 610, and storing AFDX frames in a plurality of mailboxes 625, each mailbox corresponding to a virtual link in reception or transmission. The reception mailboxes have been represented in black and the transmission mailboxes are shaded. Finally, an applicative level module 630 controls the AFDX interface 620.

When the physical interface 610 receives a signal over the uplink, this signal is demodulated and decoded to provide AFDX frames to the AFDX interface 620. The physical interface can for example be of the modular type and connected to the AFDX interface by a MII (Media Independent Interface) interface, not shown. Thus, the physical interface could be easily changed depending on the media Ethernet type: 100 base T, Gigabit, etc.

The AFDX interface 620 reads virtual link identifiers present in headers of AFDX frames and stores these frames in the reception mailboxes as a function of these identifiers. To do this, the AFDX interface contains a mapping table giving for each virtual link identifier the associated reception mailbox.

FIG. 6 represents three reception mailboxes, respectively associated with the virtual links $VL_{ka}$, $VL_{k'a}$, $VL_{pq}$. The AFDX frames stored in these mailboxes are read successively by the applicative module 630.

When the subscriber terminal 600 is the recipient of the virtual links (herein $VL_{ka}$, $VL_{k'a}$), the AFDX frames read are locally processed.

On the other hand, when the subscriber terminal 600 is not the recipient of the virtual link (herein $VL_{pq}$), the applicative module loops back this link by storing AFDX frames received in the corresponding emission mailbox. These frames are then sent over the downlink by the AFDX interface 620 via the physical interface 610. As already indicated in connection with FIG. 5, these AFDX frames are broadcasted to all the equipments 550. However, only the equipment $E_q$ recipient of the virtual link $VL_{pq}$ preserves these frames after reading in the header the virtual link identifier, the other equipments remove them.

Emission mailboxes are further provided for virtual links output by the subscriber terminal and intended to an equipment (monocast virtual link) or several equipments (multicast virtual link). For example, the emission mailbox designated as $VL_{al}$ corresponds to the virtual link, the source of which is the subscriber terminal and the recipient of which is the equipment $E_l$. The AFDX frames stored in this mailbox are sent over the downlink by the AFDX interface, via the physical interface. Once again, only the recipient $E_l$ preserves the frames in question.

The AFDX interface 620 can further provide for the information management at the IP and UDP levels. It can take the form of a software module or an ASIC type integrated circuit.

The invention claimed is:

1. A full-duplex, deterministic, and redundant frame switching network comprising
at least one frame switch to which are connected a plurality of equipment,
at least one terminal being a subscriber to said network, and
a passive optical network connected between the frame switch and the plurality of equipment, the optical line terminal of which consists of the frame switch and the optical network terminals of which consist of said equipment, said passive optical network broadcasting over the downlink every frame output by said frame switch to all said equipment and multiplexing over the uplink the frames transmitted by said equipment;
wherein the passive optical network comprises an optical coupler connected to a port of said frame switch by a first optical fiber and to said plurality of equipment by a plurality of second optical fibers; and
wherein, for a virtual link output by a first equipment and intended to a second equipment of said plurality, the first and second equipment being connected to the optical coupler, said virtual link being incident on said port of the frame switch, said switch is configured to selectively loop this virtual link back to said port.

2. The network according to claim 1, wherein the passive optical network multiplexes over the uplink the frames respectively transmitted by said equipment using a multiplexing by transmission time interval, a distinct transmission time interval being allocated to each equipment.

3. The network according to claim 2, wherein said frame switch controls the allocation of the transmission time intervals to said equipment.

4. The network according to claim 2, wherein a subscriber to this network controls the allocation of the transmission time intervals to said equipment.

5. The network according to claim 1, wherein the passive optical network multiplexes over the uplink the frames respectively transmitted by said equipment using a wavelength multiplexing, a distinct wavelength being allocated to each equipment.

6. The network according to claim 1, wherein said frame switch contains a switching table for switching frames relating to different virtual links, said table indicating, for each virtual link, an input port and an output port of said switch, a frame relating to this virtual link received on said input port being switched on said output port, said table further indicating that the output port is identical to the input port for said virtual link output by the first equipment and intended to the second equipment.

7. The network according to claim 1, wherein the frame switch comprises a second port, wherein a terminal being a subscriber to the network is connected to the second port of the frame switch, distinct from said port, the subscriber terminal looping back any virtual link coming from a first equipment and intended to a second equipment of said plurality.

8. A full-duplex, deterministic, and redundant frame switching network comprising
a terminal and
a plurality of equipment, being subscribers to the network, and
a passive optical network, the optical line terminal of which consists of said terminal and the optical network terminals of which consist of said equipment, said passive optical network broadcasting over the downlink every frame transmitted by said terminal to all said equipment and multiplexing over the uplink the frames transmitted by said equipment;
wherein the passive optical network comprises an optical coupler connected to a port of said terminal by a first optical fiber and to said plurality of equipment by a plurality of second optical fibers; and
wherein, for a virtual link output by a first equipment and intended to a second equipment of said plurality, the first and second equipment being connected to the optical coupler, said virtual link being incident on said port of the terminal, said terminal is configured to selectively loop this virtual link back to said port.

9. The network according to claim 8, wherein the passive optical network multiplexes over the uplink the frames respectively transmitted by said equipment using a multiplexing by transmission time interval, a distinct transmission time interval being allocated to each equipment.

10. The network according to claim 9, wherein said terminal controls the allocation of the transmission time intervals to said equipment.

11. The network according to claim 8, wherein the passive optical network multiplexes over the uplink the frames respectively transmitted by said equipment using a wavelength multiplexing, a distinct wavelength being allocated to each equipment.

12. The network according to claim 8, wherein said terminal comprises a physical interface to which is connected said first optical fiber, an interface, communicating with said physical interface and storing the frames received or to be transmitted by the latter in a plurality of mailboxes, each mailbox being associated with a virtual link in reception or transmission, and an applicative module controlling said interface.

13. The network according to claim 12, wherein the interface contains a table indicating for each virtual link identifier a mailbox in transmission or reception, said interface reading virtual link identifiers present in the headers of the frames received by the physical interface and storing these frames in the reception mailboxes as a function of these virtual link identifiers.

14. The network according to claim 12, wherein, for a virtual link between first and second equipment of said plurality of equipment, said applicative module reads the frames stored in the reception mailboxes associated with this virtual link and stores them in the transmission mailboxes associated with the same virtual link.

15. The network according to claim 1, wherein the frame switch comprises one or both of an electro-optical converter in communication with downlink signals or an optoelectronic converter in communication with uplink signals.

* * * * *